US012212921B2

(12) United States Patent
Kueller

(10) Patent No.: US 12,212,921 B2
(45) Date of Patent: Jan. 28, 2025

(54) APPARATUS FOR SOUND CONVERSION WITH AN ACOUSTIC FILTER

(71) Applicant: FRAUNHOFER-GESELLSCHAFT ZUR FOERDERUNG DER ANGEWANDTEN FORSCHUNG E.V., Munich (DE)

(72) Inventor: Jan Kueller, Ilmenau (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/880,910

(22) Filed: Aug. 4, 2022

(65) Prior Publication Data

US 2022/0377454 A1 Nov. 24, 2022

Related U.S. Application Data

(63) Continuation of application No. PCT/EP2021/052648, filed on Feb. 4, 2021.

(30) Foreign Application Priority Data

Feb. 7, 2020 (DE) ......................... 102020201533.3

(51) Int. Cl.

| | |
|---|---|
| ***H04R 1/28*** | (2006.01) |
| ***G10K 11/02*** | (2006.01) |
| ***G10K 11/04*** | (2006.01) |
| ***G10K 11/18*** | (2006.01) |
| ***H04R 1/10*** | (2006.01) |
| ***H04R 1/22*** | (2006.01) |

(52) U.S. Cl.

CPC ........... *H04R 1/2853* (2013.01); *G10K 11/04* (2013.01); *G10K 11/18* (2013.01); *H04R 1/10* (2013.01)

(58) Field of Classification Search

CPC ... H04R 1/22; H04R 1/02; H04R 1/28; H04R 1/2803; H04R 1/2815; H04R 1/2819; H04R 1/2853; H04R 1/10; H04R 25/48; H04R 25/652; G10K 11/04; G10K 11/18; G10K 11/02

See application file for complete search history.

(56) References Cited

U.S. PATENT DOCUMENTS 3,157,750 A * 11/1964 Weingartner .......... H04R 1/225 381/373
3,985,960 A * 10/1976 Wallace, Jr. ......... H04R 1/1016 381/328
4,239,945 A 12/1980 Atoji et al.
4,807,612 A * 2/1989 Carlson ................... A61F 11/08 128/868

(Continued)

FOREIGN PATENT DOCUMENTS

CN 104167203 A 11/2014
DE 102010022117 A1 11/2010

(Continued)

*Primary Examiner* — Edgardo San Martin
(74) *Attorney, Agent, or Firm* — PERRY + CURRIER INC.

(57) ABSTRACT

An apparatus for sound conversion is provided. The apparatus includes a sound channel and a sound transducer coupled to the sound channel, and the apparatus comprises an acoustic low-pass filter arranged in the sound channel.

16 Claims, 5 Drawing Sheets

(56) References Cited

U.S. PATENT DOCUMENTS

| | | | | | |
|---|---|---|---|---|---|
| 5,012,890 | A * | 5/1991 | Nagi | H04R 1/2826 381/353 |
| 5,261,006 | A * | 11/1993 | Nieuwendijk | H04R 1/345 381/345 |
| 5,729,605 | A | 3/1998 | Bobisuthi et al. | |
| 5,793,000 | A * | 8/1998 | Sabato | H04R 1/025 181/182 |
| 5,970,157 | A | 10/1999 | Yoest | |
| 6,568,135 | B1 | 5/2003 | Yokoyama et al. | |
| 6,938,601 | B2 * | 9/2005 | Fukumoto | F02M 35/1216 123/184.57 |
| 7,634,099 | B2 | 12/2009 | Harvey et al. | |
| 7,740,104 | B1 * | 6/2010 | Parkins | A61F 11/08 181/129 |
| 8,107,665 | B2 * | 1/2012 | Haapapuro | H04R 1/1016 381/370 |
| 8,280,094 | B2 * | 10/2012 | Lehdorfer | H04R 1/2803 381/328 |
| 8,351,629 | B2 * | 1/2013 | Parker | H04R 1/2857 381/345 |
| 9,309,843 | B2 * | 4/2016 | Hwang | F02M 35/1233 |
| 11,115,774 | B2 * | 9/2021 | Zhang | H04S 7/304 |
| 11,255,303 | B2 * | 2/2022 | Satarino | F16L 55/02763 |
| 11,317,223 | B2 * | 4/2022 | Zurbruegg | H04R 25/453 |
| 11,564,031 | B2 * | 1/2023 | Peeters | H04R 1/1016 |
| 11,640,816 | B1 * | 5/2023 | Mathur | H04R 1/28 181/198 |
| 2011/0051981 | A1 | 3/2011 | Lehdorfer et al. | |
| 2013/0051580 | A1 | 2/2013 | Miller | |
| 2016/0295315 | A1 * | 10/2016 | Kuwahara | H04R 1/2849 |
| 2020/0178003 | A1 * | 6/2020 | Zurbruegg | H04R 25/604 |
| 2021/0400401 | A1 * | 12/2021 | Zurbruegg | H04R 1/1016 |
| 2022/0079813 | A1 * | 3/2022 | Lawrence | G10K 11/162 |
| 2023/0092004 | A1 * | 3/2023 | Hrudey | G10K 11/172 181/207 |

FOREIGN PATENT DOCUMENTS

| | | | | |
|---|---|---|---|---|
| DE | 112012003495 | T5 | 5/2014 | |
| DE | 202015100370 | U1 | 2/2015 | |
| EP | 1176355 | A2 * | 1/2002 | F02M 35/1216 |
| JP | 2001003322 | A | 1/2001 | |
| JP | 2019024178 | A | 2/2019 | |
| KR | 101169888 | B1 | 7/2012 | |

* cited by examiner

APPARATUS FOR SOUND CONVERSION WITH AN ACOUSTIC FILTER

CROSS-REFERENCES TO RELATED APPLICATIONS

This application is a continuation of copending International Application No. PCT/EP2021/052648, filed Feb. 4, 2021, which is incorporated herein by reference in its entirety, and additionally claims priority from German Application No. DE 10 2020 201 533.3, filed Feb. 7, 2020, which is incorporated herein by reference in its entirety.

Embodiments of the present invention relate to an apparatus for sound conversion, and in particular to an apparatus for sound conversion with an apparatus for adjusting the acoustic impedance (acoustic filter). Further embodiments relate to an acoustic filter. Some embodiments relate to an acoustic filter through special sound guiding designs.

BACKGROUND OF THE INVENTION

Common headphones, hearables (smart headphones/earphones) or hearing aids often do not have an optimum frequency response for the ear. Adjusting the frequency response of headphones, hearables or hearing aids to a desired target curve is often technically elaborate.

In addition, each sound transducer has a different electroacoustic behavior and reacts differently to acoustic loads, such as the human ear. Here, it is particularly problematic that systems with a high quality, such as MEMS loudspeakers, (1) are often difficult to damp and there may be damages to the sound transducer in case of an incorrect or insufficient damping, and (2) are often only efficient in a small frequency range.

In addition, due to incorrect or insufficient sound guiding measures, the efficiency of the sound transducer is conventionally not optimally utilized. This leads to a loss of sound pressure level (SPL) in certain frequency ranges and/or to a limitation of the mechanical capacity.

Narrow-band filters are known. They mostly have a negative effect on the phase and the sound. In addition, they are accompanied by elaborate signal processing and/or static pre-distortion.

In addition, external acoustic filter elements are known. They usually consist of several different materials and often have to be manufactured/integrated in an elaborate way. In addition, external acoustic filter elements usually have a broadband effect and are therefore not tuned to the sound transducer used.

[1] describes an earphone with an earphone housing and an element for providing sound including a sound guiding tube and one or several drivers. The earphone housing contains one or several housing terminals that couple the internal housing volume with the volume outside of the earphone.

[2] describes a sealed headphone, wherein the headphone comprises a shielding pad fixed to the front side of a mounting plate provided with sound openings, an electroacoustic transducer attached to the rear side of the mounting plate, a housing covering the electroacoustic transducer, a coupling aperture to couple a space in front of the mounting plate with a space behind the mounting plate, and a resonance circuit of an acoustic-mechanical system, consisting of the volume compliances of the spaces in front of and behind the mounting plate and an acoustic mass reactance of the coupling aperture.

[3] describes a headset enabling a user to switch between different frequency responses for the headset by manipulating mechanical acoustic elements of the headset. The acoustic elements enable setting the transmission paths between a transducer element in the headset and the auditory canal of the user as well as setting the resonance characteristics of the headset housing itself. Setting the transmission path is carried out by manipulating openings in and between different volumes containing the transducer and the auditory canal, and by using different resistance elements along such transmission paths.

SUMMARY

An embodiment may have an apparatus for sound conversion, wherein the apparatus comprises a sound channel and a sound transducer coupled to the sound channel, wherein the apparatus comprises an acoustic low-pass filter arranged in the sound channel, wherein the acoustic low-pass filter divides a volume of the sound channel occupied by the acoustic low-pass filter into a first partial volume and at least one second partial volume, wherein the first partial volume and the at least one second partial volume are coupled via at least one slit, wherein the at least one slit expands towards the sound channel; wherein the first partial volume is surrounded by the at least one second partial volume.

Another embodiment may have an apparatus for adjusting the acoustic impedance of a sound transducer, wherein the apparatus for adjusting the acoustic impedance is configured to divide a volume occupied by the apparatus for adjusting the acoustic impedance into a first partial volume and at least one second partial volume, wherein the first partial volume and the at least one second partial volume are coupled via at least one slit so that the apparatus for adjusting the acoustic impedance comprises a low-pass character, wherein the at least one slit expands towards a sound channel, wherein the first partial volume is surrounded by the at least one second partial volume.

Embodiments provide an apparatus for sound conversion, wherein the apparatus comprises a sound channel and a sound transducer coupled to the sound channel, wherein the apparatus comprises an acoustic low-pass filter arranged in the sound channel.

In embodiments, the apparatus may comprise a microperforated plate arranged in the sound channel between the sound transducer and the acoustic low-pass filter.

In embodiments, the acoustic low-pass filter may divide a volume of the sound channel occupied by the acoustic low-pass filter into a first partial volume and at least one second partial volume, wherein the first partial volume and the at least one second partial volume are coupled by at least one slit.

In embodiments, the at least one second partial volume may be coupled to the sound transducer exclusively via the first partial volume.

In embodiments, the first partial volume may be concentrically surrounded by the at least one second partial volume.

In embodiments, the at least one slit may expand towards the sound channel.

In embodiments, the first partial volume may be an internal partial volume, wherein the at least one second partial volume is at least one external partial volume.

In embodiments, the internal partial volume and the at least one external partial volume may be coupled via a plurality of slits, wherein the plurality of slits are arranged symmetrically with respect to a rotation axis of the sound channel.

In embodiments, the micro-perforated plate may be tuned to the sound transducer.

For example, a hole diameter, a hole distance, and/or a thickness of a micro-perforated plate may be tuned to the sound transducer. In addition, the micro-perforated plate may have a defined distance to the sound transducer, determining the target frequency range (e.g. at 3 kHz). The closer the micro-perforated plate is arranged at the sound transducer, the higher the shift of the target frequency range. The hole diameter, the hole distance, and/or the plate thickness determine the degree of damping.

In embodiments, the micro-perforated plate may be configured to damp an acoustic treble/mid tone range.

The treble/mid tone range depends on the dimensioning and may be in the range of 800 Hz to 20 kHz, for example. In this case, the micro-perforated plate is not capable of damping the resonance frequency (e.g. at 9 kHz) since the acoustic resistance of the micro-perforated plate is not sufficient.

In embodiments, the micro-perforated plate may be configured to shift sound energy into a target frequency range.

In embodiments, the sound channel may be rotationally symmetrical.

In embodiments, the sound channel may be a first sound channel coupled to a first side of the sound transducer, wherein the apparatus comprises a second sound channel coupled to a second side of the sound transducer, opposite to the first side.

In embodiments, the second channel may have a cylindrical shape.

For example, the second channel may be a reflex channel (e.g. a reflex tube). It may be dimensioned such that it damps the resonance. This increases the acoustic pressure in case of resonance with respect to the sound transducer to such an extent that the resonance is decomposed into partial oscillations of the sound transducer membrane and is damped therewith. Thus, the sound transducer is mechanically relieved.

In embodiments, the sound transducer may be a loudspeaker or a microphone.

In embodiments, the apparatus may be an auditory canal phone (in-ear phone), a smart headphone/earphone, a hearing aid, a loudspeaker, or a microphone.

In embodiments, the sound transducer may be an MEMS sound transducer.

Further, embodiments provide an apparatus for adjusting the acoustic impedance of a sound transducer, wherein the apparatus for adjusting the acoustic impedance is configured to divide a volume occupied by the apparatus for adjusting the acoustic impedance into a first partial volume and at least one second partial volume, wherein the first partial volume and the at least one second partial volume are coupled by at least one slit (e.g. such that the apparatus for adjusting the acoustic impedance has a low-pass character).

Further, embodiments provide an acoustic low-pass filter for a sound transducer, wherein the acoustic low-pass filter is configured to divide a volume of a sound channel coupled to a sound transducer, occupied by the acoustic low-pass filter, into a first partial volume and at least one second partial volume, wherein the first partial volume and the at least one second partial volume are coupled by at least one slit.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
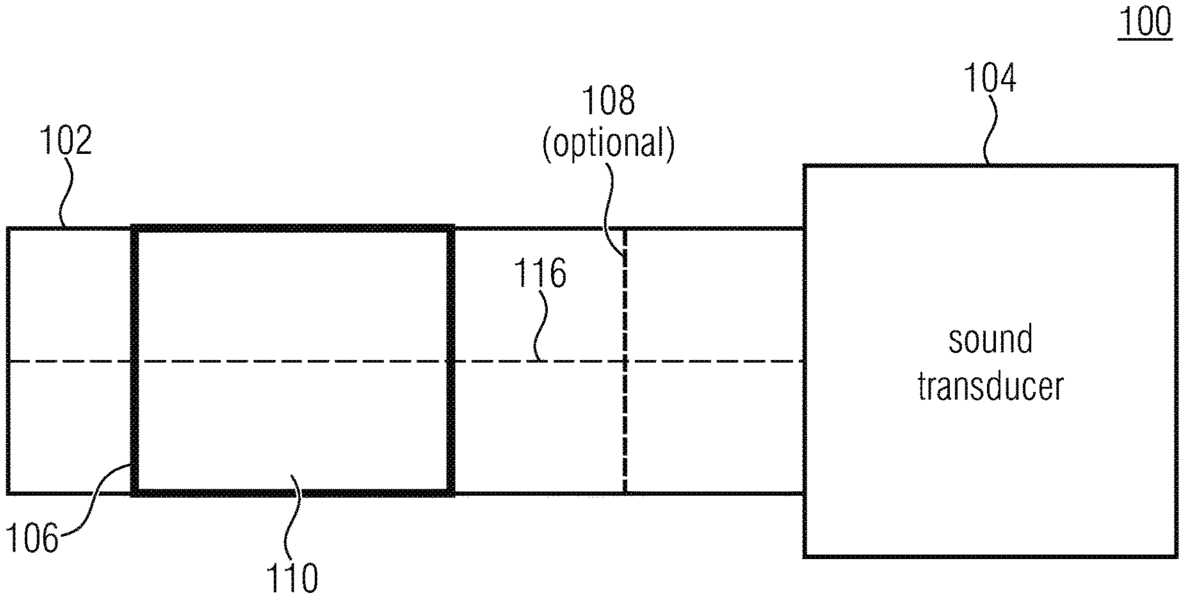
FIG. 1 shows a schematic side view of an apparatus for sound conversion according to an embodiment of the present invention.

In the subsequent description of the embodiments of the present invention, the same elements or elements having the same effect are provided in the drawings with the same reference numerals so that their description is interchangeable.

FIG. 1 shows a schematic view of an apparatus 100 for sound conversion according to an embodiment of the present invention. The apparatus 100 comprises a sound channel 102 and a sound transducer 104 coupled to the sound channel 102. Furthermore, the apparatus 100 comprises an apparatus 106 for adjusting the acoustic impedance arranged in the sound channel 102. Here, the apparatus 106 for adjusting the acoustic impedance comprises a low-pass character.

In embodiments, the apparatus 106 for adjusting the acoustic impedance is an acoustic low-pass filter.

In embodiments, the apparatus 100 may optionally comprise a micro-perforated plate 108 arranged in the sound channel 102 between the sound transducer 104 and the acoustic low-pass filter 106.

In embodiments, for example, the sound transducer may be an MEMS sound transducer or a miniature sound transducer. In the following description, the sound transducer is exemplarily assumed to be an MEMS sound transducer. However, the subsequent description is also applicable to other sound transducers, such as a miniature sound transducer.

In embodiments, the acoustic low-pass filter 106 may divide a volume 110 of the sound channel 102 occupied by the low-pass filter 106 into a first partial volume (e.g. first partial air volume) and at least one second partial volume (e.g. second partial air volume), wherein the first partial volume and the at least one second partial volume are coupled by at least one slit, as is subsequently described in more detail on the basis of FIGS. 2 and 3.

Here, the subsequent description exemplarily assumes that the sound channel 102 is cylindrical. However, the invention is not limited to such embodiments, rather, the sound channel 102 may have any other appropriate shape. Thus, in embodiments, the sound channel may be rotationally symmetrical (e.g. with respect to a rotation axis 116 expanding along the sound channel, or in the sound propagation direction). Furthermore, it is possible for the sound channel 102 to be curved. In this case, a length of the sound channel 102 determines the degree of damping.

Figure 2:
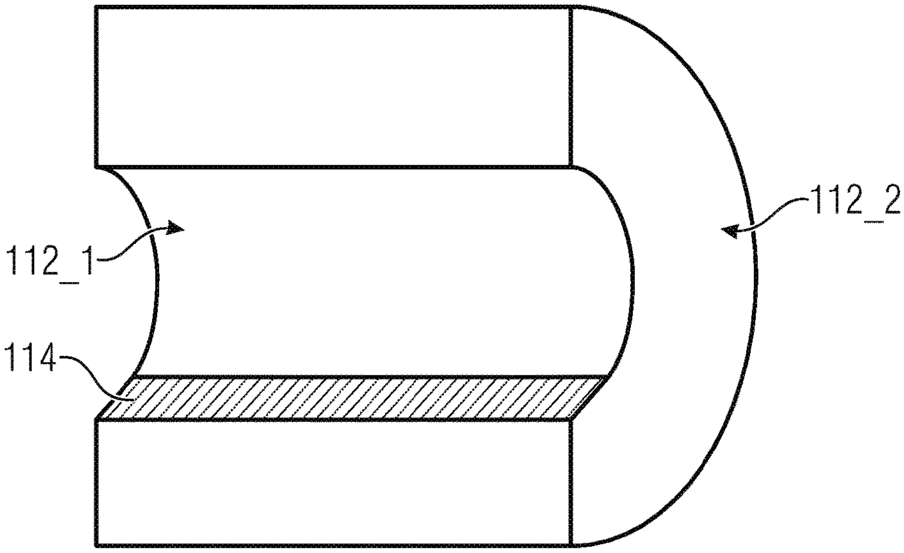
FIG. 2 shows a schematic sectional view in the longitudinal direction of the acoustic low-pass filter shown in FIG. 1 according to an embodiment of the present invention.

FIG. 2 shows a schematic sectional view in the longitudinal direction of the acoustic low-pass filter 106 of the apparatus 100 shown in FIG. 1 according to an embodiment of the present invention.

Figure 3:
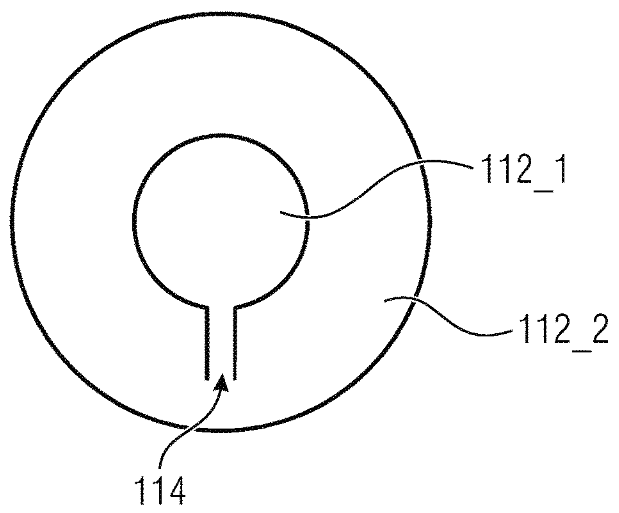
FIG. 3 shows a schematic cross-sectional view of the acoustic low-pass filter shown in FIG. 1 according to an embodiment of the present invention.

FIG. 3 shows a schematic cross-sectional view of the acoustic low-pass filter 106 shown in FIG. 2 according to an embodiment of the present invention.

As can be seen in FIGS. 2 and 3, the acoustic low-pass filter 106 may be configured to divide a volume 110 (cf. FIG. 1) of the sound channel 102 occupied by the acoustic low-pass filter 106 into a first partial volume 112_1 and at least one second partial volume 112_2, wherein the first partial volume 112_1 and the at least one second partial volume 112_2 are coupled by at least one slit 114. The at least one slit 114 may have a width of 50-100 μm.

In embodiments, the first partial volume 112_1 may be an internal partial volume, whereas the at least one second partial volume 112_2 is at least one external partial volume (e.g. concentrically) surrounding the internal partial volume.

In this case, in embodiments, the at least one second partial volume 112_2 (e.g. external partial volume) is coupled to the first partial volume 112_1 exclusively via the at least one slit 114, and therefore to the MEMS sound transducer 104 of the apparatus 100. Thus, the acoustic low-pass filter 106 may be configured to essentially fully enclose, i.e. apart from the at least one slit 114, the at least one second partial volume so as to obtain an essentially, i.e. apart from the at least one slit 114, closed partial volume.

Here, the at least one slit 114 may expand along the sound channel 102, e.g. in the sound propagation direction, such as in parallel to the axis 116 (cf. FIG. 1). If the sound channel 102, and therefore also the sound propagation direction, is curved, the at least one slit 114 may obviously also be curved, or may adapt itself to the curvature of the sound channel, or the sound propagation direction.

FIGS. 2 and 3 exemplarily assume that the acoustic low-pass filter 106 is configured to divide the volume 110 occupied by the acoustic low-pass filter 106 into precisely one first partial volume 112_1 (e.g. internal partial volume) and one second partial volume 112_2 (e.g. external partial volume), i.e. into two partial volumes. In embodiments, the acoustic low-pass filter 106 may obviously also be configured to divide the volume 110 occupied by the acoustic low-pass filter 106 into more than two partial volumes, such as into three or four partial volumes. In this case, the first partial volume 112_1 (e.g. internal partial volume) may be coupled to each of the other partial volumes (external partial volumes) via at least one slit each.

Figure 4:
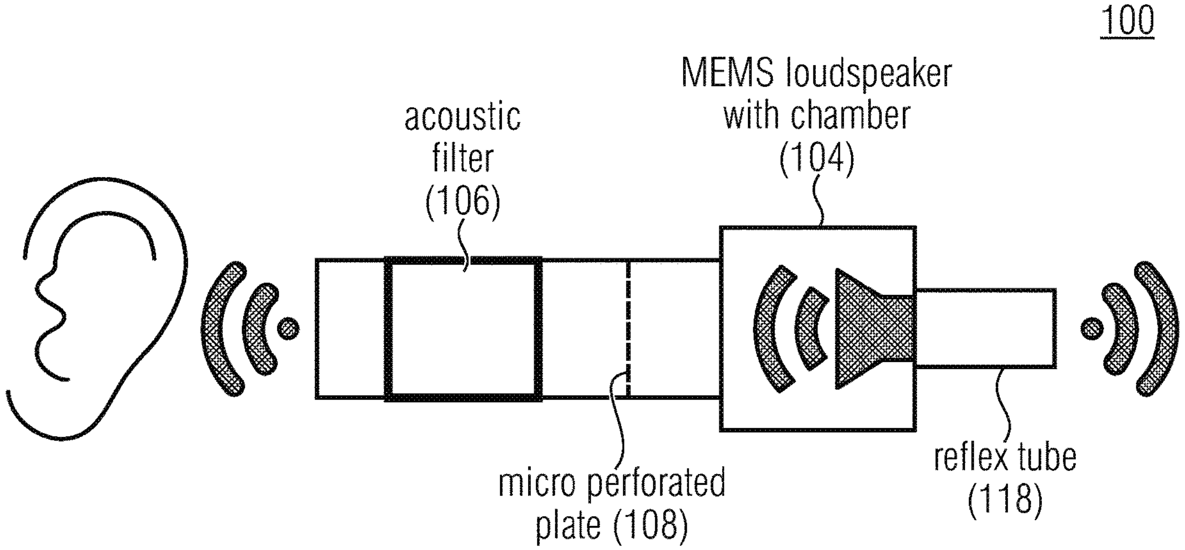
FIG. 4 shows a schematic side view of an apparatus for sound conversion according to a further embodiment of the present invention.

FIG. 4 shows a schematic side view of an apparatus 100 for sound conversion according to a further embodiment of the present invention. In other words, FIG. 4 shows a fundamental design of the sound guidance for an MEMS loudspeaker for in-ear applications.

The apparatus 100 comprises a first sound channel 102 and a MEMS sound transducer (e.g. MEMS loudspeaker with chamber) 104, wherein the first sound channel 102 is coupled to a first side of the MEMS sound transducer. In addition, the apparatus 100 comprises an acoustic low-pass filter 106 arranged in the first sound channel 102. In addition, the apparatus 100 may optionally comprise a micro-perforated plate 108 arranged in the first sound channel 102 between the MEMS sound transducer 104 and the acoustic low-pass filter 106. In addition, the apparatus 100 may optionally comprise a second sound channel (e.g. reflex tube) 118 coupled to a second side of the MEMS sound transducer 104, opposite to the first side.

Figure 5:
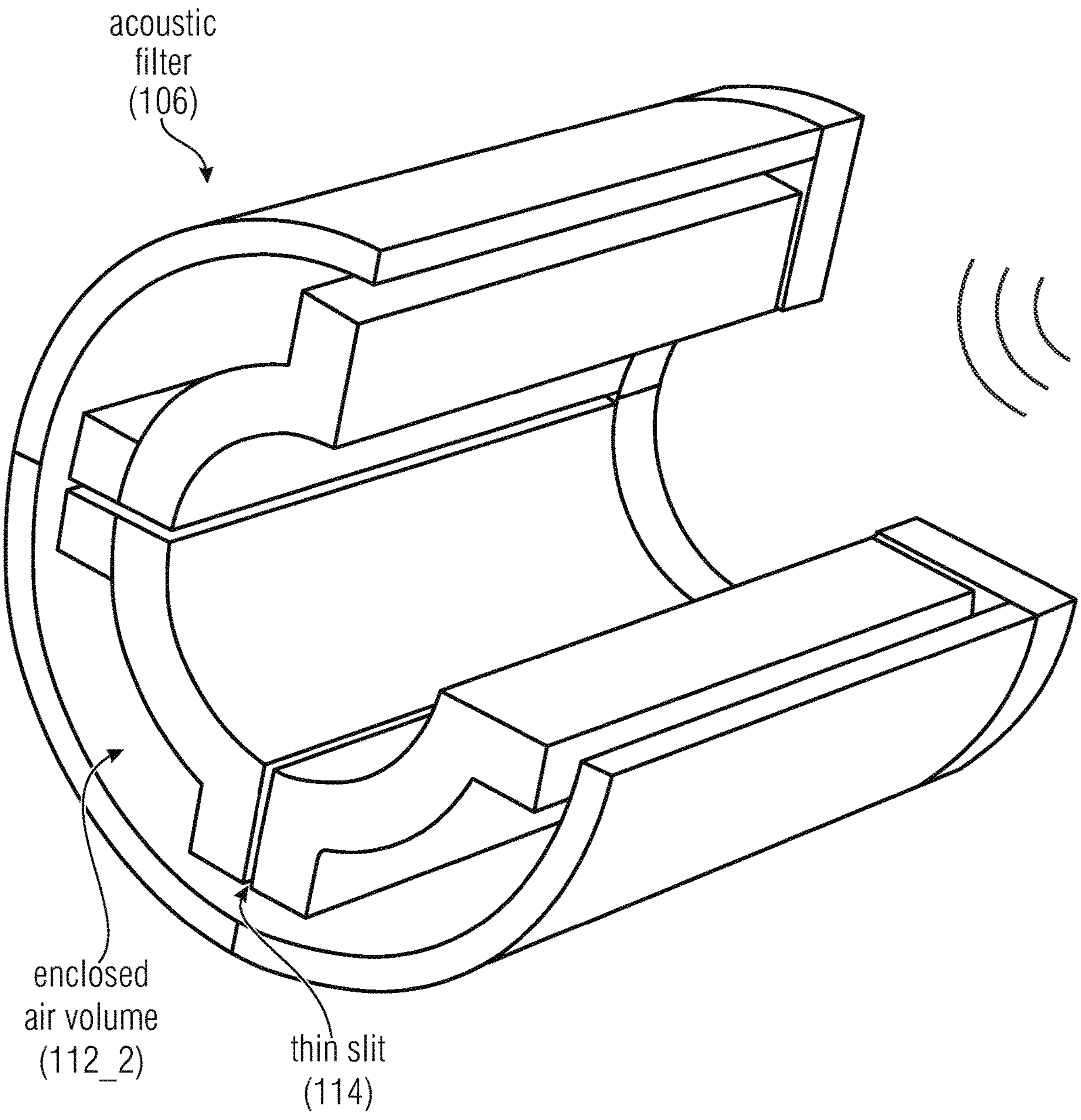
FIG. 5 shows a three-dimensional cross-sectional view of an acoustic low-pass filter according to an embodiment of the present invention.

FIG. 5 shows a three-dimensional cross-sectional view of an acoustic low-pass filter (acoustic filter element with low-pass characteristic) according to an embodiment of the present invention.

Figure 6:
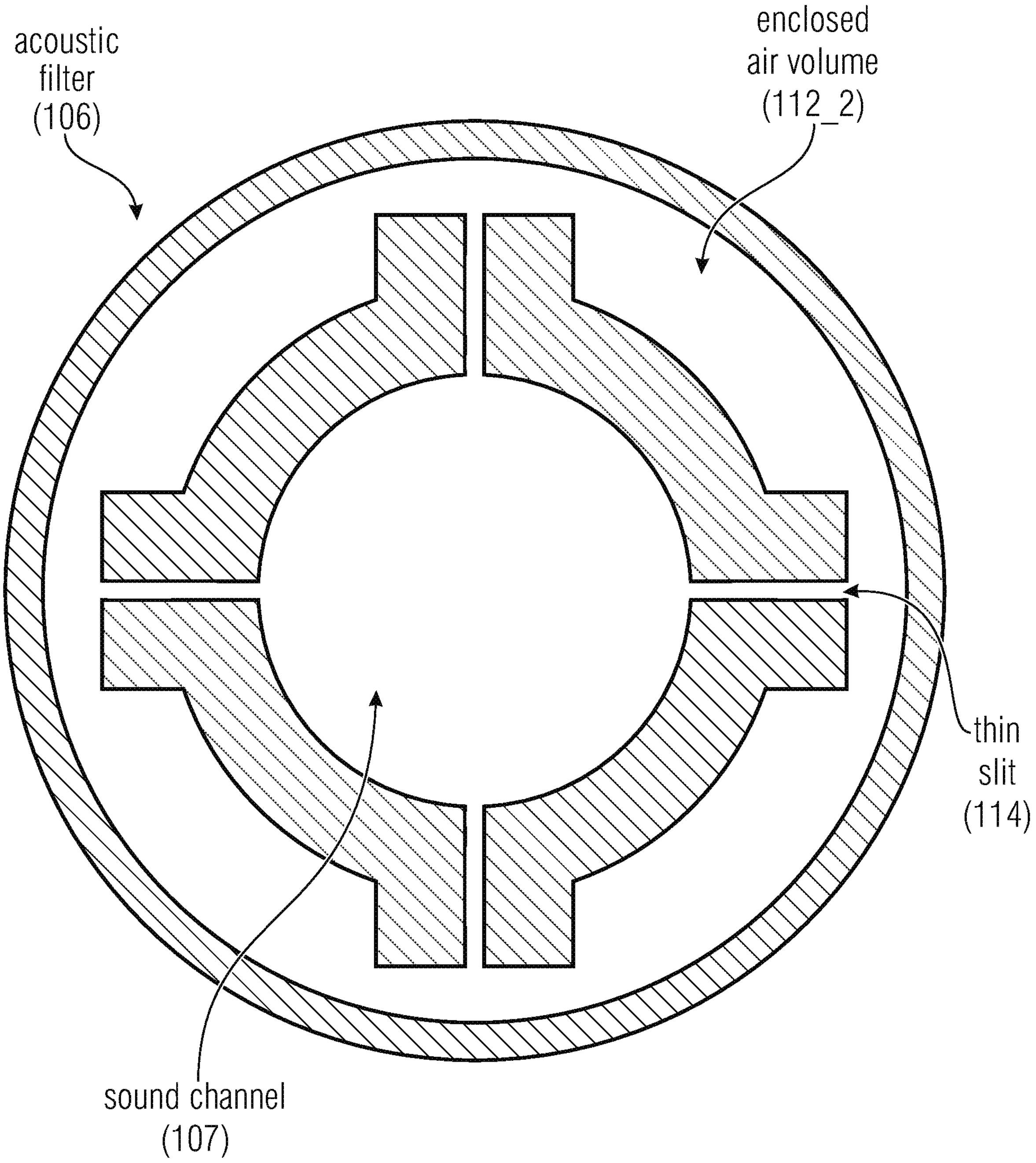
FIG. 6 shows a two-dimensional cross-sectional view of an acoustic low-pass filter according to an embodiment of the present invention.

FIG. 6 shows a two-dimensional cross-sectional view of an acoustic low-pass filter (acoustic filter element with low-pass filter characteristic) according to an embodiment of the present invention.

As can be seen in FIGS. 5 and 6, the acoustic low-pass filter 106 may be configured to divide a volume 110 (cf. FIG. 1) of the sound channel 102 occupied by the acoustic low-pass filter 106 into a first partial volume 112_1 and a second partial volume 112_2, wherein the first partial volume 112_1 and the second partial volume 112_2 are coupled via one or several slits 114, e.g. via four slits.

In embodiments, the acoustic low-pass filter 106 may therefore comprise a filter sound channel 107 forming the first partial volume 112_1 (and guiding the sound generated by the MEMS sound transducer, for example), wherein the filter sound channel 107 is connected via at least one slit 114 to an otherwise closed chamber of the acoustic low-pass filter 106 (e.g. concentrically) surrounding the filter sound channel 107 and forming the second partial volume 112_2. The slits 114 enable a reduction of the acoustic speed in the treble tone range due to thermoviscous losses in the filter sound channel 107 (low-pass effect). The low-pass effect results from lower frequencies passing through the filter sound channel 107 in an unfiltered manner since the boundary layer thickness is larger than the slits 114 for lower frequencies. Thus, the lower frequencies are forwarded in an unobstructed manner.

Figure 7:
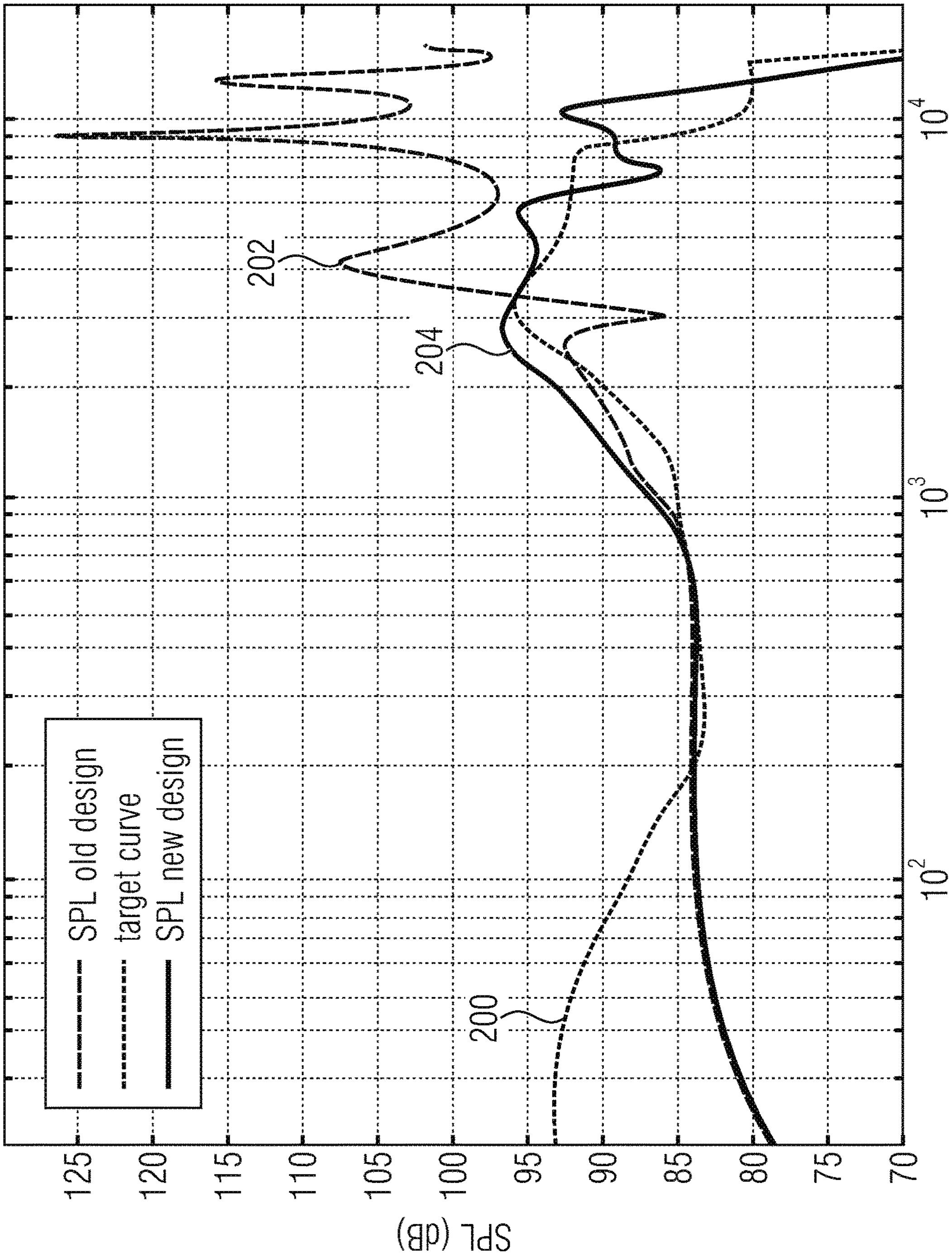
FIG. 7 shows in a diagram a target frequency response, a frequency response of a conventional in-ear headphone, and a frequency response of an in-ear headphone according to an embodiment of the present invention.

FIG. 7 shows in a diagram a target frequency response 200, a frequency response 202 of a conventional in-ear headphone, and a frequency response 204 of an in-ear headphone according to embodiments of the present invention. In this case, the ordinate describes the sound pressure level in decibels, and the abscissa describes the frequency.

In other words, FIG. 7 shows a comparison of sound pressure levels of a conventional (non-optimized) sound guidance design and an inventive (optimized) sound guidance design of an in-ear headphone with respect to a target curve for in-ear applications.

The following describes further embodiments of the apparatus 100 for sound conversion.

In embodiments, the apparatus 100 (e.g. a MEMS in-ear headphone design) may comprise filter elements (e.g. acoustic low-pass filter 106, micro-perforated plate 108, second sound channel 118) with a selective transmission frequency response, tuned to the MEMS sound transducer 104.

In embodiments, the apparatus 100 may comprise a micro-perforated plate (MPP) 108.

In embodiments, the micro-perforated plate 108 may have a defined distance to the sound transducer 104 and/or a defined dimension. The micro-perforated plate 108 shifts sound energy towards lower frequencies.

In embodiments, the micro-perforated plate 108 may be tuned to the sound transducer 104. A micro-perforated plate 108 tuned to the sound transducer 104 enables damping in the treble/mid tone range and a shift of the sound energy into a target frequency range. Thus, the micro-perforated plate 108 acts as an acoustic resistance that lets pass certain frequency portions more or less.

In embodiments, the apparatus 100 may comprise a defined sound channel 118 (=second sound channel) (e.g.

circular) at the rear side of the sound transducer 104. The sound channel attenuates a resonance.

In embodiments, the micro-perforated plate 108 and the sound channel 118 (=second sound channel) may be adjusted or tuned with respect to each other (they interact together).

In embodiments, a rear volume of the sound transducer 104 may be defined. For example, the smaller the rear volume of the sound transducer 104, the smaller the sound channel 118 (=second sound channel) may be.

In embodiments, the defined sound channel 118 (=second sound channel) at the rear side of the sound transducer 104 may enable selective damping of the resonance frequency of the sound transducer (e.g. a MEMS loudspeaker).

In embodiments, the apparatus 100 may comprise an acoustic low-pass filter 106.

In embodiments, the acoustic low-pass filter 106 may comprise specially dimensioned slits that, together with an closed air volume (=second partial volume), enable a reduction of the acoustic speed in the treble tone range due to thermoviscous losses in the sound channel, acting as a low-pass.

In embodiments, the acoustic low-pass filter 106 may have a symmetrical cross-section.

In embodiments, the acoustic low-pass filter 106 may comprise an closed air volume 112_2 (=at least one second partial volume).

In embodiments, this air volume 112_2 (=at least one second partial volume) may be connected to the sound channel 106 (=first sound channel) via narrow defined slits 114.

In embodiments, the acoustic low-pass filter 106 may comprise a sound channel in the interior of the filter 106 and slits 114 and an air volume 112_2 at the outer edge of the filter 106.

In embodiments, the acoustic low-pass filter 106 may comprise four or more slits 114.

In embodiments, the slits 114 may have a width of 50-100 μm.

In embodiments, a length of the filter geometry is variable.

Embodiments of the present invention provide one or several of the advantages described in the following.

Embodiments make it possible to reach a target curve.

Embodiments make it possible to print (e.g. with a 3-D printer) the sound guidance in a fully three-dimensional way. Individual elements are no longer necessary.

In embodiments, the acoustic filter 106 is adjustable. A change of lengths determines the degree of damping.

In embodiments, the acoustic filter 106 is independent from the volume. The dimension of the slits decides the degree of damping.

Embodiments make it possible to reliably achieve the target curve, even in case of deviations between sound transducers of the same type.

In embodiments, hardly an signal processing is required, or no signal processing is required at all, to achieve the target curve.

In embodiments, narrowband filters are no longer required, which has positive effects with respect to the phase and the sound quality.

Embodiments enable mechanical relieve of the sound transducer and therefore a better performance, or greater resilience.

Embodiments described herein may be used for sound guidance/filtering for in-ear headphones, hearables, hearing aids, micro-machines, MEMS microphones, MEMS loudspeakers, smartphone loudspeakers (micro-loudspeakers).

Embodiments provide an apparatus 100 (e.g. an MEMS in-ear headphone design) with filter elements (e.g. acoustic low-pass filter 106, micro-perforated plate 108, second sound channel 118) with a selective transmission frequency response, tuned to the MEMS sound transducer 104.

Embodiments use the thermoviscous effect for filtering high frequencies, as well as several precisely dimensioned filter elements.

Embodiments damp the frequency response in the upwards direction.

In embodiments, the filter is independent from its surrounded volume, rather, the dimensioning of the slits is decisive.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] U.S. Pat. No. 7,634,099 B2
[2] U.S. Pat. No. 4,239,945 A
[3] U.S. Pat. No. 5,729,605 A

The invention claimed is:

1. An Apparatus for sound conversion, wherein the apparatus comprises a sound channel and a sound transducer coupled to the sound channel, wherein the apparatus comprises an acoustic low-pass filter arranged in the sound channel, wherein the acoustic low-pass filter divides a volume of the sound channel occupied by the acoustic low-pass filter into a first partial volume and at least one second partial volume, wherein the first partial volume and the at least one second partial volume are coupled via at least one slit, wherein the at least one slit expands along the sound channel in a sound propagation direction;

wherein the first partial volume is completely surrounded by the at least one second partial volume, wherein the at least one slit enables a reduction of an acoustic speed in a treble tone range due to thermoviscous losses in a filter sound channel thereby providing a low-pass effect, wherein the low-pass effect results from lower frequencies passing through the filter sound channel in an unfiltered manner since a boundary layer thickness is larger than the slits for lower frequencies.

2. The Apparatus according to claim 1, wherein the apparatus comprises a micro-perforated plate arranged in the sound channel between the sound transducer and the acoustic low-pass filter.

3. The Apparatus according to claim 1, wherein the at least one second partial volume is coupled to the sound transducer exclusively via the first partial volume.

4. The Apparatus according to claim 1, wherein the first partial volume is concentrically surrounded by the at least one second partial volume.

5. The Apparatus according to claim 1, wherein the first partial volume is an internal partial volume, wherein the at least one second partial volume is at least an external partial volume.

6. The Apparatus according to claim 5, wherein the internal partial volume and the at least one external partial volume is coupled via a plurality of slits, wherein the plurality of slits is arranged symmetrically with respect to a rotation axis of the sound channel.

7. The Apparatus according to claim 2, wherein the micro-perforated plate is tuned to the sound transducer.

8. The Apparatus according to claim 2, wherein the micro-perforated plate is configured to damp an acoustic treble/mid tone range.

9. The Apparatus according to claim 2, wherein the micro-perforated plate is configured to shift sound energy into a target frequency range.

10. The Apparatus according to claim 1, wherein the sound channel is rotationally symmetrical.

11. The Apparatus according to claim 1, wherein the sound channel is a first sound channel coupled to a first side of the sound transducer, wherein the apparatus comprises a second sound channel coupled to a second side of the sound transducer, opposite to the first side.

12. The Apparatus according to claim 11, wherein the second sound channel is cylindrical.

13. The Apparatus according to claim 1, wherein the sound transducer is a loudspeaker or a microphone.

14. The Apparatus according to claim 1, wherein the apparatus is an auditory canal phone, a smart headphone/earphone, a hearing aid, a loudspeaker, or a microphone.

15. The Apparatus according to claim 1, wherein the sound transducer is an MEMS sound transducer.

16. The Apparatus for adjusting the acoustic impedance of a sound transducer, wherein the apparatus for adjusting the acoustic impedance is configured to divide a volume occupied by the apparatus for adjusting the acoustic impedance into a first partial volume and at least one second partial volume, wherein the first partial volume and the at least one second partial volume are coupled via at least one slit so that the apparatus for adjusting the acoustic impedance comprises a low-pass character, wherein the at least one slit expands along a sound channel in sound propagation direction, wherein the first partial volume is surrounded by the at least one second partial volume, wherein the at least one slit enables a reduction of an acoustic speed in a treble tone range due to thermoviscous losses in a filter sound channel thereby providing a low-pass effect, wherein the low-pass effect results from lower frequencies passing through the filter sound channel in an unfiltered manner since a boundary layer thickness is larger than the slits for lower frequencies.

* * * * *